United States Patent [19]

Hansen

[11] Patent Number: 4,870,537

[45] Date of Patent: Sep. 26, 1989

[54] BREAKAGE-RESISTANT CAPACITOR LEADS

[75] Inventor: N. Peter Hansen, Oshkosh, Wis.

[73] Assignee: Brunswick Corporation, Skokie, Ill.

[21] Appl. No.: 303,769

[22] Filed: Jan. 30, 1989

[51] Int. Cl.$^4$ .............................................. H01G 1/14
[52] U.S. Cl. ................................................... 361/306
[58] Field of Search ............... 361/302, 306, 321, 515, 361/518, 520, 522, 531, 538, 540, 301

[56] References Cited

U.S. PATENT DOCUMENTS

| | | | |
|---|---|---|---|
| 239,370 | 3/1881 | De Forest | 361/301 |
| 2,101,896 | 12/1937 | Burlingame | 361/301 X |
| 3,986,084 | 10/1976 | Carter et al. | 361/302 |

FOREIGN PATENT DOCUMENTS 980440 12/1950 France ................................ 361/302

OTHER PUBLICATIONS

"High-Frequency Vibration Testing of Film Capacitors", Mannheim et al, Sprague Electric Company Technical Paper, TP 84-2, Mar. 8, 1984.
"A-C Application of Plastic-Film Capacitors", Kowalsky et al, Sprague Electric Company Technical Paper, TP 83-4, Mar. 9, 1983.
"Capacitors", Donald M. Trotter, Jr., Scientific American, Jul. 1988, pp. 86-90B.

Primary Examiner—Donald A. Griffin
Attorney, Agent, or Firm—Andrus, Sceales, Starke & Sawall

[57] ABSTRACT

A cylindrical capacitor (20) has lead terminal wires (46, 48) bonded to respective distally opposite ends (28, 30) and extending oppositely axially through the hollow center (32) of the capacitor and out the other end of the capacitor for external circuit connection. Each lead terminal wire has a spiral wound end (58, 62) attached to the respective capacitor end, and a lead portion (60, 64) extending integrally therefrom and axially through the capacitor. Staggered length integral insulators (34, 36) extend through the capacitor and around respective axially extending lead wires and have respective ends (50, 54) extending axially through respective spiral wound ends of the leads. The ends of the insulators are heat staked (70, 72) against respective annular washers (66, 68) to hold the leads in compression against the ends of the capacitor.

18 Claims, 2 Drawing Sheets

U.S. Patent  Sep. 26, 1989  Sheet 1 of 2  4,870,537
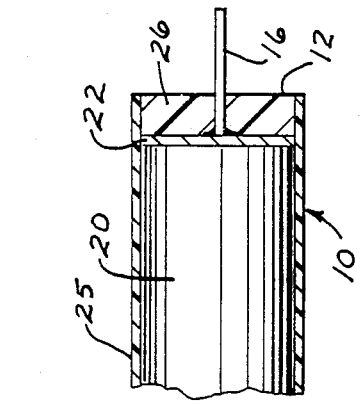
FIG. 3
PRIOR ART
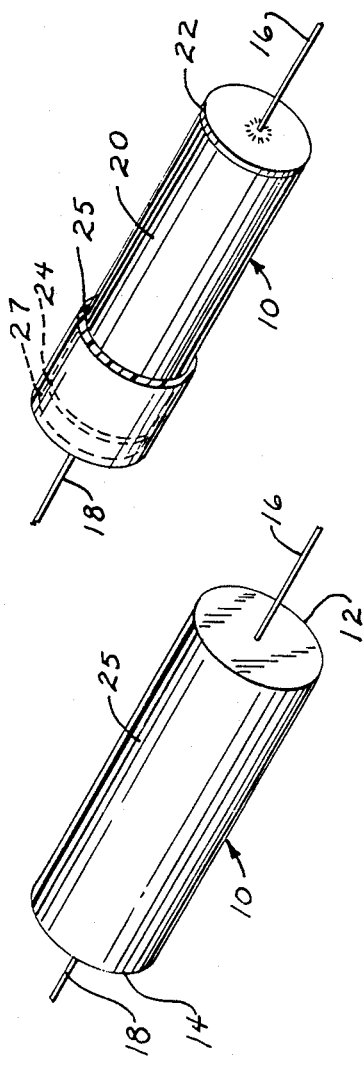
FIG. 2
PRIOR ART
FIG. 1
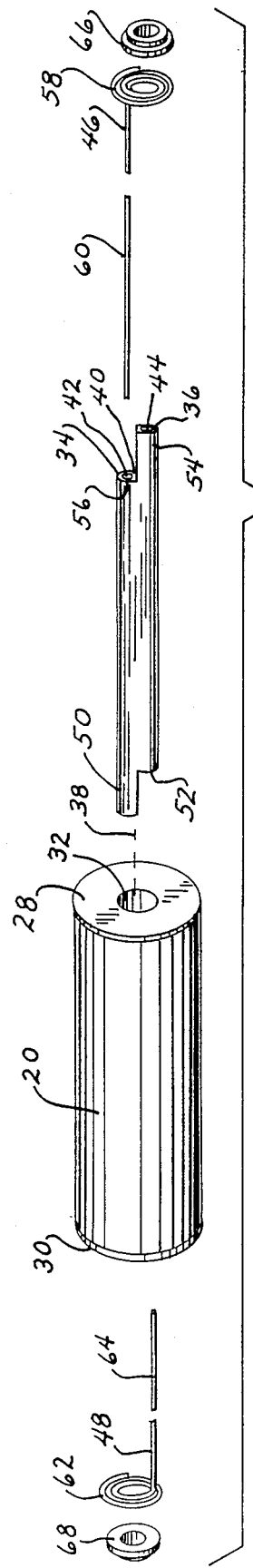
FIG. 4

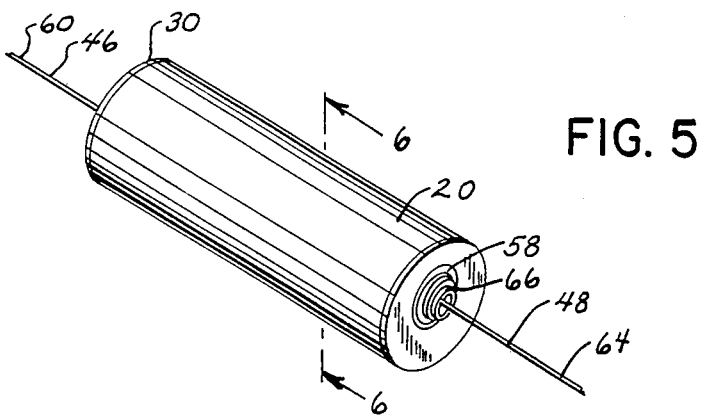
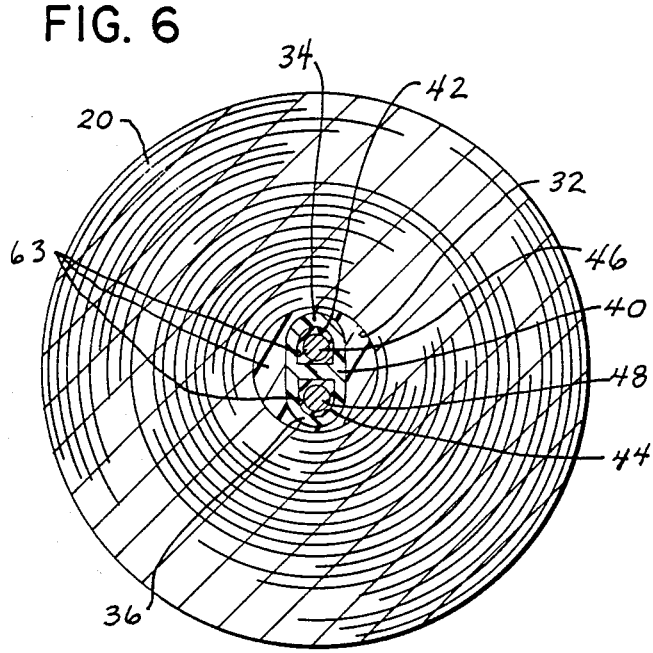
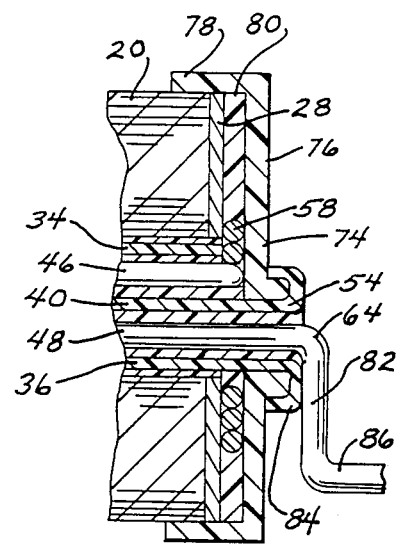
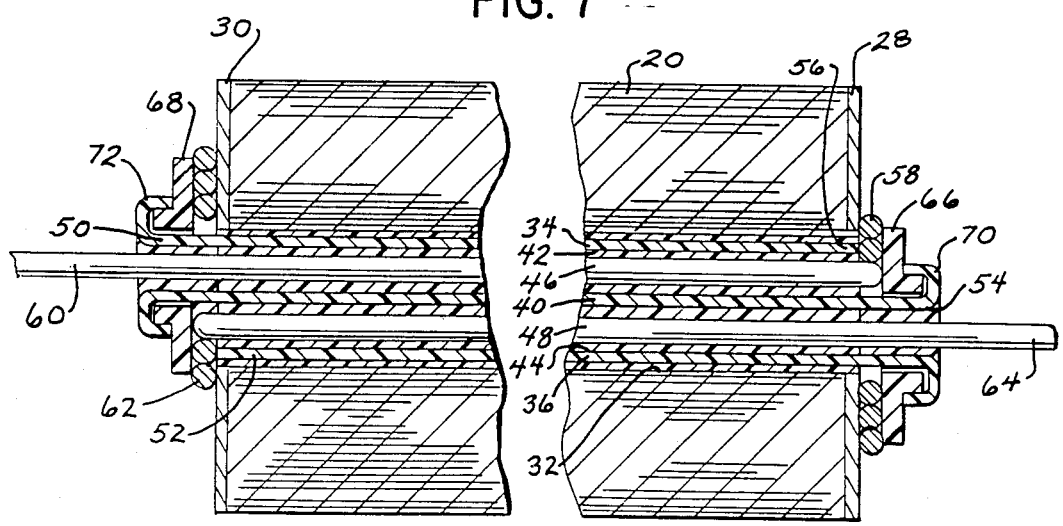

BREAKAGE-RESISTANT CAPACITOR LEADS

BACKGROUND AND SUMMARY

The invention relates to electrical capacitors, and more particularly to lead terminal structure and attachment therefor.

The invention arose during development efforts directed toward improved electronic ignition switch boxes for marine engines. Breakage of capacitor leads from the ends of the capacitor is a particular problem.

Cylindrically wound capacitors typically have soldered ends to which the lead terminal wires are soldered or resistance welded. Such leads are cantilevered to the end of the capacitor, and any force applied to the lead puts the bond in tension, and hence is susceptible to breakage.

The present invention addresses and solves the noted capacitor lead breakage problem in a particularly simple and effective manner.

BRIEF DESCRIPTION OF THE DRAWINGS

FIG. 1 shows a cylindrical capacitor known in the prior art. FIG. 1 also shows the final appearance of a capacitor constructed in accordance with the present invention.

FIG. 2 is a partially cut away view of a capacitor known in the prior art.

FIG. 3 is a sectional view of a portion of FIG. 2.

FIG. 4 is an exploded perspective view illustrating portions of a capacitor constructed in accordance with the present invention.

FIG. 5 is an assembly view of the parts of FIG. 4.

FIG. 6 is a sectional view taken along 6—6 of FIG. 5.

FIG. 7 is a side sectional view of the structure of FIG. 5.

FIG. 8 is a view like a portion of FIG. 7 and shows an alternate embodiment.

DETAILED DESCRIPTION

Prior Art

FIG. 1 shows a cylindrical capacitor 10 having distally opposite axial ends 12 and 14 with lead terminal wires 16 and 18 extending axially therefrom. The capacitor is formed by a cylindrically wound foil 20, FIGS. 2 and 3, having soldered ends 22 and 24 with respective lead terminal wires 16 and 18 soldered thereto. The structure is enclosed in an outer mylar wrap 25 filled at the axial ends with epoxy as shown at 26 and 27. This structure is subject to the above noted breakage problem.

Present Invention

FIG. 4 shows cylindrically wound capacitor foil 20 of FIGS. 2 and 3. The ends of the foil are soldered at 28 and 30 identically to soldered ends 22 and 24 except that the hollow center core 32 of the cylinder is left open and not covered by the solder. A pair of hollow tubular electrical insulators 34 and 36 are inserted into hollow cylinder 20 along its central axis 38. In preferred form, insulators 34, 36 are of a material providing thermal expansion matching with the capacitor. In preferred form, insulators 34 and 36 are integrally joined at a common wall 40, FIG. 6, to form a single unitary member in the form of a double straw having parallel axially extending passages 42 and 44 therethrough. In an alternative, insulators 34, 36 are placed in the mandrel before winding of foil 20, such that the latter is wound on the insulators.

Lead terminal wire 46 is inserted axially leftwardly through insulator passage 42 in hollow core 32, and lead terminal wire 48 is inserted axially rightwardly through insulator passage 44 in hollow core 32. As shown in FIGS. 4 and 7, the left end 50 of insulator 34 extends axially leftwardly beyond left end 52 of insulator 36 and beyond left end 30 of the capacitor. Right end 54 of insulator 36 extends axially rightwardly beyond right end 56 of insulator 34 and beyond right end 28 of the capacitor. The right end of lead terminal wire 46 is a flat spiral wound end 58 integral with axially extending portion 60 and circumscribing right end 54 of insulator 36 extending axially rightwardly therethrough. Left end 62 of lead terminal wire 48 is a flat spiral wound end integral with axially extending portion 64 and circumscribing left end 50 of insulator 34 extending axially leftwardly therethrough. Spiral ends 58 and 62 are soldered or welded to respective capacitor ends 28 and 30. Core 32 and passages 42 and 44 are filled with silicone rubber 63. The silicone rubber filler provides desirable thermal expansion matching.

Annular step shoulder insulating washer 66 is slid axially leftwardly over right end 64 of lead terminal wire 48 and over and around right end 54 of insulator 36 and axially abuts against spiral end 58 of lead terminal wire 46. Annular step shoulder washer 68 is slid axially rightwardly over left end 60 of lead terminal wire 46 and over and around left end 50 of insulator 34 and axially abuts against spiral end 62 of lead terminal wire 48. The outer right portion of right end 54 of insulator 36 is heat staked gainst washer 66 to deform thereover as shown at 70, FIG. 7. The left outer portion of left end 50 of insulator 34 is heat staked against washer 68 to deform thereover as shown at 72. The heat staking against washers 66 and 68 locks the lead terminal wires in compression against the ends of the capacitor. This is facilitated by the integral joining of insulators 34 and 36 at common shared wall 40, or other suitable attachment of insulators 34 and 36 to each other. The structure is then encapsulated in an outer mylar wrap filled at the axial ends with epoxy to yield a capacitor as shown in FIG. 1.

FIG. 8 shows an alternate embodiment and uses like reference numerals from FIG. 7 where appropriate to facilitate clarity. Washer 66 is replaced by an insulating end cap 74 having a radially outwardly extending portion 76 covering the end of the capacitor, and a lip portion 78 extending axially along the side of the capacitor. Silicone rubber 80 is provided in the gap between soldered end 28 and end cap 74. Right end 64 of lead terminal wire 48 is bent downwardly at portion 82 at a 90° angle to engage the outer heat staked portion of the core insulator as shown at 84, to provide additional compressive clamping, and then is bent rightwardly at portion 86 to extend axially for circuit connection. The structure is then encapsulated in an outer mylar wrapper filled with epoxy at the axial ends.

It is recognized that various equivalents, alternatives and modifications are possible within the scope of the appended claims.

I claim:

1. A capacitor having a pair of distally opposite ends for lead terminal connection, and a pair of leads, each extending through said capacitor and having an end connected to a respective one of said capacitor ends, wherein one of said leads is attached to one of said capacitor ends and extend through said capacitor beyond the other capacitor end for external circuit connection, and wherein the other of said leads is attached to said other capacitor end and extends through said capacitor beyond said one capacitor end for external circuit connection, and comprising a first electrical insulator around said one lead and extending through said capacitor, and a second electrical insulator around said second lead and extending through said capacitor.

2. The invention according to claim 1 wherein said first and second insulators each have first and second ends, said first end of said first insulator extending beyond said other end of said capacitor and beyond said second end of said second insulator, said second end of said second insulator extending beyond said one end of said capacitor and beyond said second end of said first insulator.

3. The invention according to claim 2 wherein each of said leads comprises a wire extending through a respective said insulator and having a flat spiral would end circumscribing the other of said insulators and attached to the respective said end of said capacitor.

4. The invention according to claim 3 comprising first and second annular washers each around a respective one of said insulators extending from a respective end of said capacitor and compressively engaging a respective said flat spiral wound end of the other of said leads.

5. The invention according to claim 4 wherein the respective said insulator extending through the respective said washer is deformingly heat staked thereagainst to provide said compression.

6. The invention according to claim 4 wherein each said washer comprises an end cap having a radially extending portion over a respective said capacitor end, and a lip portion extending axially along the side of the capacitor.

7. The invention according to claim 4 wherein said leads are bent at an angle after extending through a respective said washer to provide said compression.

8. The invention according to claim 7 wherein said leads are bent at a second angle to extend axially from the ends of said capacitor.

9. The invention according to claim 4 wherein the respective said insulator extending through the respective said washer is deformingly heat staked thereagainst to provide said compression, and wherein the respective said lead wire after extending through said washer is bent at an angle to engage said deformed heat staked insulator and additionally provide said compression.

10. The invention according to claim 4 wherein said flat spiral ends are integral with respective said leads to resist breakage from the ends of said capacitor.

11. The invention according to claim 1 wherein said first and second electrical insulators are hollow tubular members integrally joined along a common wall to form a singular member extending through said capacitor having first and second parallel tubular passages isolated from each other by said common wall and each receiving a respective said lead extending therethrough.

12. The invention according to claim 11 wherein opposite ends of said common wall cooperate with the respective said lead at the respective said end of said capacitor and compress said respective lead against said respective capacitor end.

13. A capacitor having a pair of distally opposite ends for lead terminal connection, and a pair of leads, each extending through said capacitor and having an end connected to a respective one of said capacitor ends, wherein said capacitor comprises a hollow center core receiving said leads, and comprising thermal expansion matching filler material in said core.

14. The invention according to claim 13 comprising first and second electrical insulators extending through said core and each having a respective passage receiving a respective one of said leads, and comprising thermal expansion matching filler material in each of said passages.

15. A cylindrical capacitor extending along a central axis and having distally opposite axial ends for lead terminal connection, said cylindrical capacitor being hollow along said central axis, a first lead attached to one of said axial ends of said capacitor, a second lead attached to the other of said axial ends of said capacitor, first and second tubular axially extending electrical insulators extending along said hollow central axis of said cylindrical capacitor, said second insulator extending axially in one direction beyond said first insulator and beyond said one axial end of said capacitor, said first insulator extending axially in the other direction beyond said second insulator and beyond said other axial end of said capacitor, said first lead comprising a wire exbending axially through said insulator through said hollow central axis of said capacitor, one end of said first lead wire being attached to said one axial end of said capacitor, and the other end of said first lead wire extending axially in said other direction beyond said other axial end of said capacitor, said second lead comprising a wire extending axially through said second insulator through said hollow central axis of said capacitor, said second lead wire having one end attached to said other axial end of said capacitor, the other end of said second lead wire extending axially in said one direction beyond said one axial end of said capacitor, said first and second lead wires extending axially parallel to each other through the hollow central portion of said cylindrical capacitor.

16. The invention according to claim 15 wherein said one end of said first lead wire is a flat spiral wound end circumscribing said second insulator extending axially therethrough, and wherein said one end of said second lead wire is a flat spiral wound end circumscribing said first insulator extending axially therethrough.

17. The invention according to claim 15 wherein said first and second electrical insulators are hollow tubular members integrally joined along a common wall to form a singular member extending through said capacitor and having first and second parallel tubular passages isolated from each other by said common wall and each receiving a respectives lead extending therethrough.

18. The invention according to claim 17 comprising thermal expansion matching filler material in said hollow cylindrical capacitor along said central axis and in each of said hollow tubular first and second insulators.

* * * * *